Figures 1, 2:
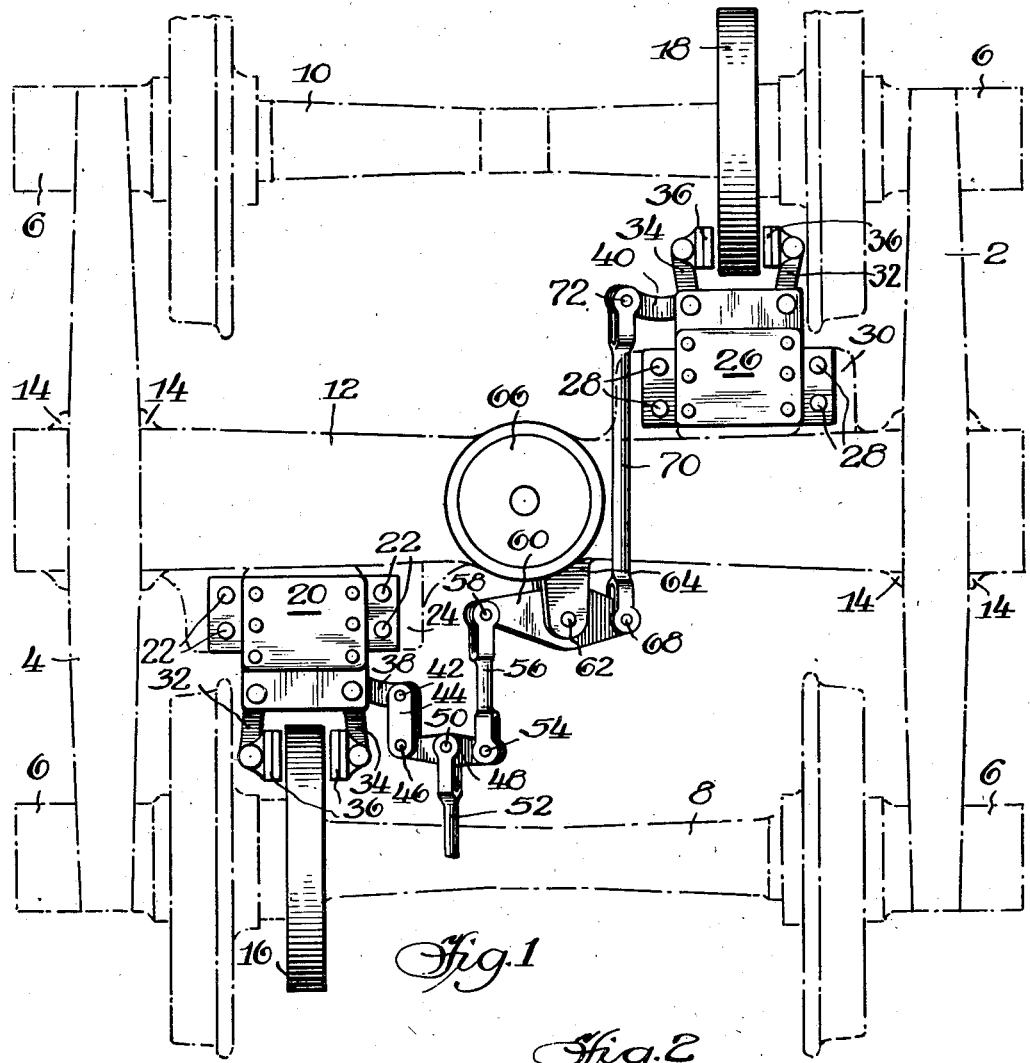

Nov. 22, 1949 W. H. BASELT 2,488,845
BOLSTER MOUNTED BRAKE
Filed Jan. 5, 1946 2 Sheets-Sheet 2
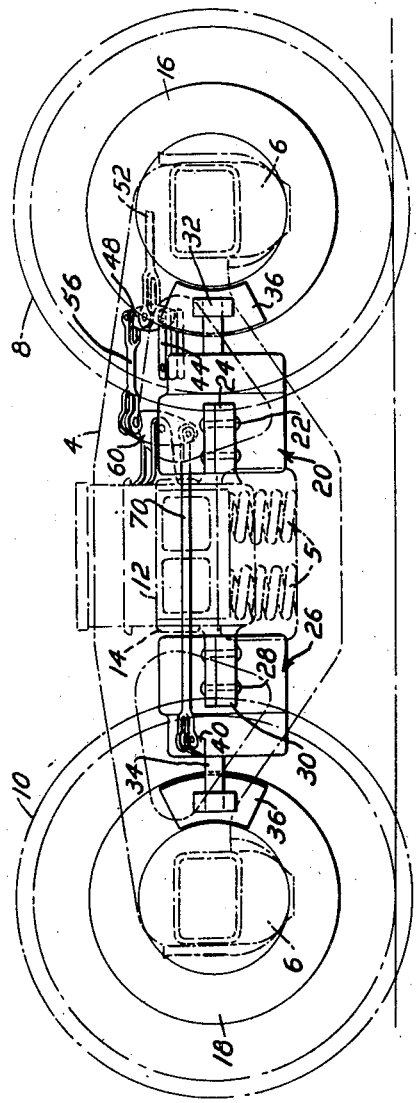
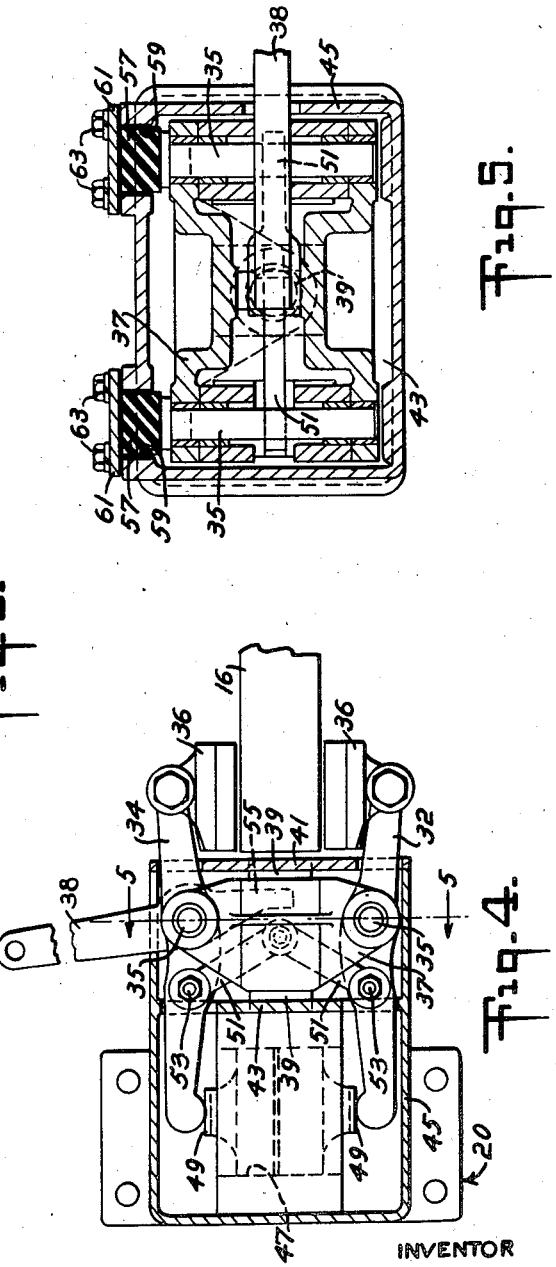
INVENTOR
WALTER H. BASELT
BY
ATTORNEY Patented Nov. 22, 1949

2,488,845

UNITED STATES PATENT OFFICE 2,488,845

BOLSTER MOUNTED BRAKE

Walter H. Baselt, Flossmoor, Ill., assignor to American Steel Foundries, Chicago, Ill., a corporation of New Jersey Application January 5, 1946, Serial No. 639,213

18 Claims. (Cl. 188—56)

My invention relates to a brake arrangement for a railway car truck and, more particularly, braking means for a railway freight car truck of ordinary design wherein spaced side frames have integral journal boxes for connection to supporting wheel and axle assemblies and are arranged with spring seats on the tension member thereof, mounting springs for support of a bolster in interlocking engagement with the side frame columns.

This common type of freight car truck does not require such heavy braking as passenger equipment, and I have devised my novel braking arrangement with that in mind.

The general object of my invention is to devise an off-wheel braking means for such a four wheel freight car truck wherein each wheel and axle assembly may be afforded a brake disc or drum conveniently mounted adjacent one wheel, and braking means may be supported from the adjacent side of the bolster for engagement therewith.

In the modification I have illustrated, the braking means for the respective wheel and axle assemblies is shown mounted adjacent the diagonally opposite wheels, thus affording equal braking for the two wheel and axle assemblies and, at the same time, balancing the torque forces on the bolster which supports the braking means.

In the drawings, Figures 1–5 illustrate my novel brake arrangement as applied to an ordinary freight car truck, Figure 1 being a top plan view thereof, Figure 2 a view taken from the bottom as seen in Figure 1, Figure 3 being a reduced side elevational view of the truck, Figure 4 being a top plan view partly in horizontal section of a brake unit, and Figure 5 being a sectional view on the line 5—5 of Figure 4.

Describing the structure in detail, the side frames 2 and 4 are of conventional type, having integral boxes 6, 6 affording usual means for connection at the journal ends of the wheel and axle assemblies 8 and 10. The bolster 12 may have its opposite ends respectively supported from the side frames 2 and 4, as by springs 5 (Figure 3); and the bolster may have guided engagement with the columns of the side frame in well-known manner by the conventional guide lugs seen at 14, 14.

Adjacent the wheel at one end of the wheel and axle assembly 8 may be mounted the brake drum 16, and adjacent the diagonally opposite wheel of the other wheel and axle assembly 10 may be mounted the brake drum 18. In alignment with the brake drum 16 and on the adjacent side wall of the bolster 12 may be mounted the braking means 20, said braking means being secured as at 22, 22 to the bracket 24 which may be integral with said bolster or fixed thereon by any convenient means. Similarly aligned with the drum 18 may be a like braking unit generally designated 26, said unit 26 being secured as at 28, 28 to the bracket 30 on the bolster 12. The brake units 20 and 26 may be substantially identical with the unitary brake unit described and claimed in my United States Letters Patent No. 2,436,136, each of said units being mounted in such manner as to permit pivotal action of the brake levers supported thereon as may be desirable in order to accommodate their proper alignment with the adjacent brake drum, all as described in said patent.

Each brake unit may have a pair of levers designated respectively 32 for the outboard lever and 34 for the inboard lever, said levers being pivotally mounted by pins 35 within a pivot member 37, as best seen in Figures 4 and 5 which show the unit 20. The member 37 comprises coaxial trunnions 39 rotatably mounted within complementary sockets (not numbered) in walls 41 and 43 of a housing 45 containing a cylinder 47 having spaced pistons 49 operatively associated with respective levers 32 and 34 for actuation thereof. The pivot member 37, as more fully described in the above-mentioned patent, is a hollow member containing spaced toggle links 51 pivoted at 53 to respective levers 32 and 34. The pivot member 37 also contains a toggle actuator 55. Each lever 32 and 34 pivotally supports a brake head 36 with its associated shoe for engagement with the adjacent drum. Extending from the brake unit 20 may be a lever 38 integrally formed with the related actuator 55 serving as auxiliary actuating means for the levers 32 and 34, and likewise associated with the unit 26 may be an actuating lever 40 substantially identical in form and function with the lever 38.

As best seen in Figure 5, each pin 35 is preferably retained by a block 57 of resilient material, such as rubber, within a complementary opening 59 of the housing 45 and secured therein by a cover plate 61 mounted on the housing 45 as by studs 63, said blocks accommodating rotational movement of the pivot member 37 on its trunnions 39 thereby accommodating relative tilting movement between the bolster 12 and the wheel and axle assemblies 8 and 10, as more fully described in the above-mentioned patent. It will be understood that, if desired, the rotational mounting of member 37 may be eliminated although this may result in occasional misalignment of the brake heads 36 with respect to the rotor 16 or 18.

The actuating lever 38 may have pivotal connection as at 42 to the paired links 44, 44, the opposite ends of which may have pivotal connection as at 46 to the diagonally arranged transverse brake lever 48. An intermediate point of the lever 48 may have pivotal connection as at 50 to the clevis end of the pull rod 52, and the opposite end of the lever 48 may have pivotal connection as at 54 to the clevis end of the pull rod 56. The opposite end of the rod 56 may have pivotal connection as at 58 to the diagonally arranged dead lever 60 fulcrumed at an intermediate point as at 62 from the bracket 64 conveniently fixed on the side wall of the bolster adjacent the center plate 66.

The opposite end of the dead lever 60 may have pivotal connection as at 68 to the rod 70 extending through the opening 73 in the bolster to the opposite side thereof for pivotal connection as at 72 to the actuating arm or lever 40 of the brake unit 26.

It will thus be seen that I have so mounted the brake units at opposite ends of the bolster 12 in such manner as to fairly equally distribute the brake torques which must be absorbed by the bolster structure and, at the same time, I have so arranged the interconnecting levers and pull rods as to permit fixing the fulcruming of the dead lever from the bolster immediately adjacent the center plate thereof. By this means are thus properly balanced the forces which may be developed by the application of such a type of off-wheel brake to the conventional freight car truck, providing, at the same time, the necessary clearances in that type of equipment.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, spaced supporting wheel and axle assemblies, side frames mounted on the journal ends of said assemblies, a load carrying member spring-supported from said side frames, braking means comprising rotating members mounted on the diagonally opposite ends of respective assemblies, clasp brake means supported on said load carrying member adjacent said rotating members, common operating means connected between said clasp brake means, said operating means comprising a dead lever fulcrumed adjacent the midpoint of said load carrying member, a rod operatively connected to said dead lever and extending through said load carrying member and connected to one of said clasp brake means, a rod pivotally connected to the other end of said dead lever, an actuating lever associated with the other of said clasp brake means, equalizing means connected between said last-mentioned rod and said actuating lever, and an operating member connected to said equalizing means.

2. In a brake arrangement for a four wheel railway car truck, spaced wheel and axle assemblies, side frames supported on the journal ends thereof, a bolster spring-supported from said side frames, brake rotors supported on said assemblies adjacent diagonally opposite wheels, braking means mounted on opposite side walls of said bolster for respective rotors, common operating means for said braking means, said common operating means comprising inboard actuating levers on respective braking means, a dead lever fulcrumed from said bolster adjacent the midpoint thereof, a rod extending through said bolster and connected to one of said actuating levers and to said dead lever, and operating means for said dead lever connected between the other end thereof and the other of said actuating levers.

3. In a brake arrangement for a four wheel railway car truck, spaced wheel and axle assemblies, side frames supported on the journal ends thereof, a bolster spring-supported from said side frames, brake rotors supported on said assemblies adjacent diagonally opposite wheels, braking means mounted on opposite side walls of said bolster for respective rotors, common operating means for said braking means, each of said braking means comprising an actuating lever extending inboard therefrom, and a dead lever fulcrumed from said bolster adjacent the center plate thereof and operatively connected to both of said actuating levers, one of said operative connections comprising a rod extending through said bolster and pivotally connected to said dead lever.

4. In a brake arrangement for a railway car truck, spaced supporting wheel and axle assemblies, side frames mounted on the journal ends of said assemblies, a load carrying member spring-supported from said side frames, braking means comprising rotating members mounted on the diagonally opposite ends of respective assemblies, clasp brake means supported on said load carrying member adjacent said rotating members, common operating means connected between said clasp brake means, said operating means comprising a dead lever fulcrumed adjacent the midpoint of said load carrying member, and a rod operatively connected to said dead lever and extending through said load carrying member and connected to one of said clasp brake means.

5. In a brake arrangement for a railway car truck comprising spaced side frames, supporting wheel and axle assemblies, a bolster spring-supported by said frames, and bearing means on said bolster centrally thereof for supporting an associated car body; the combination of a brake surface on at least one of said assemblies substantially radial to the longitudinal axis thereof, and a brake unit mounted on said bolster comprising a brake support carried thereby, a lever pivoted to said support and brake means carried by said lever for engagement with said surface.

6. In a brake arrangement for a railway car truck comprising spaced side frames, supporting wheel and axle assemblies, a bolster spring-supported by said frames, and bearing means on said bolster centrally thereof for supporting an associated car body; the combination of a brake surface on at least one of said assemblies, and a brake unit mounted on said bolster comprising a brake support carried thereby, a lever pivoted to said support on a substantially vertical axis, and brake means carried by said lever for engagement with said surface.

7. In a railway car truck, spaced side frames, a pair of supporting wheel and axle assemblies, a load carrying member spring-supported on said frames, braking means mounted on the diagonally opposite side walls of said load carrying member for engagement with rotor means adjacent diagonally opposite wheels, common operating means for said braking means, said operating means comprising actuating levers associated with respective braking means, a dead lever fulcrumed at an intermediate point of said load carrying member, operative connections between said actuating levers and said dead lever, and means for operating said dead lever.

8. In a brake arrangement for a four wheel railway car truck, spaced wheel and axle assemblies, side frames supported on the journal ends thereof, a bolster spring-supported from said side frames, brake rotors supported on said assemblies adjacent diagonally opposite wheels, braking means mounted on opposite side walls of said bolster for respective rotors, common operating means for said braking means, each of said braking means comprising an actuating lever extending inboard therefrom, and a dead lever fulcrumed from said bolster adjacent the center plate thereof and operatively connected to both of said actuating levers.

9. In a brake arrangement for a railway car truck, spaced side frames, supporting wheel and axle assemblies, a bolster spring-supported on said frames, brake units mounted on said bolster at the diagonally opposite ends thereof for engagement with rotatable braking members on said assemblies, an actuating lever associated with each unit and connected to the inboard side thereof, each of said actuating levers being operatively connected to a dead lever fulcrumed from said bolster adjacent the center plate thereof, and means for operating said dead lever.

10. In a brake arrangement for a railway car truck, spaced side frames, supporting wheel and axle assemblies, a bolster spring-supported on said frames, brake units mounted on said bolster at the diagonally opposite ends thereof for engagement with rotatable braking members on said assemblies, an actuating lever connected to the inboard face of each unit, a dead lever fulcrumed from said bolster, a connecting rod between said dead lever and one of said actuating levers, and operating means connected between the other end of said dead lever and the other actuating lever.

11. In a railway car truck, spaced side frames, a pair of supporting wheel and axle assemblies, a load carrying member spring-supported on said frames, braking means mounted on the diagonally opposite side walls of said load carrying member for engagement with rotor means adjacent diagonally opposite wheels, common operating means for said braking means, said operating means comprising actuating levers associated with respective braking means, a dead lever fulcrumed at an intermediate point of said load carrying member, and operative connections between said actuating levers and said dead lever.

12. In a railway car truck, spaced side frames, a pair of supporting wheel and axle assemblies, a load carrying member spring-supported on said frames, braking means mounted on the diagonally opposite side walls of said load carrying member for engagement with rotor means adjacent diagonally opposite wheels, and common operating means for said braking means, said operating means comprising a dead lever fulcrumed from said load carrying member, and a rod pivotally connected to said lever and extending through said load carrying member for connection to one of said braking means.

13. In a brake arrangement for a railway car truck, spaced supporting wheel and axle assemblies, side frames mounted on the journal ends of said assemblies, a load carrying member spring-supported from said side frames, braking means comprising rotating members mounted on the diagonally opposite ends of respective assemblies, clasp brake means supported on said load carrying member adjacent said rotating members, and common operating means connected between said clasp brake means.

14. In a brake arrangement for a railway car truck comprising spaced side frames, supporting wheel and axle assemblies, a bolster spring-supported by said frames, and bearing means on said bolster centrally thereof for supporting an associated car body; the combination of a pair of brake surfaces on at least one of said assemblies disposed substantially radial to the longitudinal axis thereof, and a brake unit mounted on said bolster comprising a brake support carried thereby, a pair of brake levers pivotally fulcrumed to said support, and brake means carried by said levers for engagement with respective surfaces.

15. In a railway car truck, spaced side frames, a pair of supporting wheel and axle assemblies, a load carrying member spring-supported on said frames, braking means mounted on the diagonally opposite side walls of said load carrying member for engagement with rotor means adjacent diagonally opposite wheels, and common operating means for said braking means, said operating means comprising a rod extending through said load carrying member.

16. In a brake arrangement for a four wheel railway car truck, spaced wheel and axle assemblies, side frames supported on the journal ends thereof, a bolster spring-supported from said side frames, brake rotors supported on said assemblies adjacent diagonally opposite wheels, braking means mounted on opposite side walls of said bolster for respective rotors, and common operating means for said braking means.

17. In a brake arrangement for a railway car truck comprising spaced side members, supporting wheel and axle assemblies, and a bolster spring-supported by said side members; the combination of brake units at the ends of said bolster, each of said units comprising a brake support carried by the bolster, a pair of brake levers fulcrumed to said support, and brake means carried by said levers for engagement with a rotatable portion of the adjacent assembly, and a system of interconnected levers operatively connected to said brake levers for actuation thereof.

18. In a brake arrangement for a railway car truck, spaced side frames, supporting wheel and axle assemblies, a bolster spring-supported on said frames, and brake units mounted on said bolster at the diagonally opposite ends thereof for engagement with rotatable braking members on said assemblies.

WALTER H. BASELT.

REFERENCES CITED

The following references are of record in the file of this patent:

UNITED STATES PATENTS

| Number | Name | Date |
| --- | --- | --- |
| 2,355,122 | Tack | Aug. 8, 1944 |
| 2,436,136 | Baselt | Feb. 17, 1948 |